United States Patent [19]
Stevenson et al.

[11] 3,978,876
[45] Sept. 7, 1976

[54] PNEUMATIC PRESSURE REGULATOR

[75] Inventors: Thomas E. Stevenson, Willoughby Hills; Kenneth W. Cohen, Chesterland, both of Ohio

[73] Assignee: Bailey Meter Company, Wickliffe, Ohio

[22] Filed: May 23, 1975

[21] Appl. No.: 580,455

[52] U.S. Cl. ................................ 137/84; 137/85
[51] Int. Cl.² ................................... G05D 16/06
[58] Field of Search ............. 137/85, 84, 86, 116.3, 137/116.5

[56] References Cited
UNITED STATES PATENTS

| | | | |
|---|---|---|---|
| 2,915,045 | 12/1959 | Mackenzie | 137/85 X |
| 3,002,692 | 10/1961 | Williams | 137/85 X |
| 3,095,891 | 7/1963 | Clements | 137/85 |
| 3,256,740 | 6/1966 | Tate | 137/85 X |
| 3,814,119 | 6/1974 | Bertrand | 137/84 X |

*Primary Examiner*—Alan Cohan
*Attorney, Agent, or Firm*—Vytas R. Matas; Joseph M. Maguire

[57] ABSTRACT

A high stability pneumatic pressure regulator is provided by the use of a movable vane and nozzle assembly to operate a valve plug and thereby change the regulator output pressure. Movement of the vane and nozzle assembly is initiated by an adjustable input member which changes the vane to nozzle spacing and subsequently causes the vane and nozzle assembly to move with the valve plug until the normal vane to nozzle spacing is restored. A feedback of the output pressure is used to balance the adjustable input member.

7 Claims, 5 Drawing Figures

PNEUMATIC PRESSURE REGULATOR

BACKGROUND OF THE INVENTION

1. Field of the Invention

The present invention generally relates to pressure regulators and particularly to high stability pressure regulators utilizing a vane and nozzle assembly to produce an output signal used to balance the input signal.

2. Description of the Prior Art

Pressure regulators are known which utilize a vane and nozzle assembly to vary the output pressure from the regulator. In such known devices the nozzle of the vane and nozzle assembly is fixedly mounted in the regulator and an output signal from the nozzle is used to vary the regulator output pressure through an output member. This output pressure is feedback connected to balance an input signal to the regulator indicative of the desired output pressure. Thus the nozzle backpressure must actually change and must actually be transmitted to the output member controlling the regulator pressure before the output signal is established and feed back to balance the input signal.

The time delay associated with actually developing the nozzle backpressure and transmitting it to the output member usually presents no significant problems with large pressure regulators having large air volumes. However in miniature pressure regulators having small compact volumes this delay is sufficient to establish signal phase shifts which produce instability in operation. Thus miniaturization by scaling down the prior art pressure regulators was found to be unfeasible.

SUMMARY OF THE INVENTION

The aforementioned problems of the prior art devices as well as other problems are effectively solved by the present invention which eliminates the instability causing time delays usually associated with large, stationary nozzle, regulators.

The device of the present invention mounts the vane and nozzle assembly in the regulator to be movable as a unit in response to an input signal. The vane and nozzle assembly will move in a direction which will restore the desired vane and nozzle spacing. The vane and nozzle assembly is further coupled to an output member of the regulator which changes the regulator output pressure. Movement of the vane and nozzle assembly provides an anticipatory feedback signal to balance the vane to nozzle spacing. Thus the time delay associated with having to first establish a nozzle backpressure and transmitting this backpressure signal to the output member to change the output pressure is eliminated and stability is achieved with small volume miniature pressure regulators.

From the foregoing it will be seen that one aspect of the present invention is to provide a high stability miniature pressure regulator.

Another aspect of the present invention is to provide a pressure regulator producing an anticipatory signal of the desired output pressure.

Yet another aspect of the present invention is to provide a direct coupling of the vane and nozzle assembly to the output member which produces the regulator output pressure.

These and other aspects of the present invention will be more fully understood after a review of the following description of the preferred embodiment and the drawings.

DESCRIPTION OF THE PREFERRED EMBODIMENT

Figure 1:
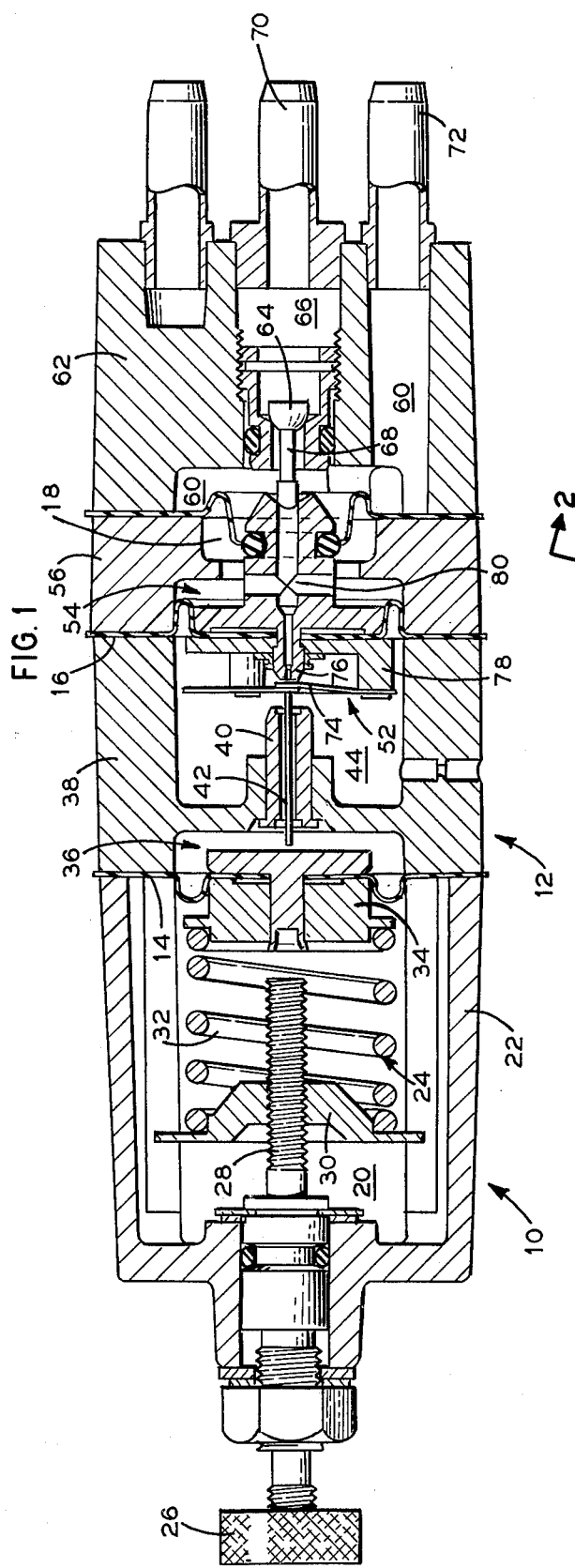
FIG. 1 is a longitudinal cross-sectional view of the pressure regulator of the present invention.

Referring now to the drawings it will be understood that the depiction is made therein to exemplify a preferred embodiment of the present invention and that the invention is not limited thereto.

Figure 2:
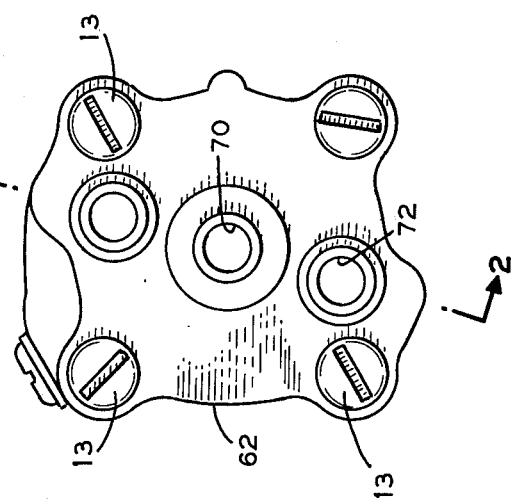
FIG. 2 is a bottom view of the FIG. 1 regulator.
Figure 3:
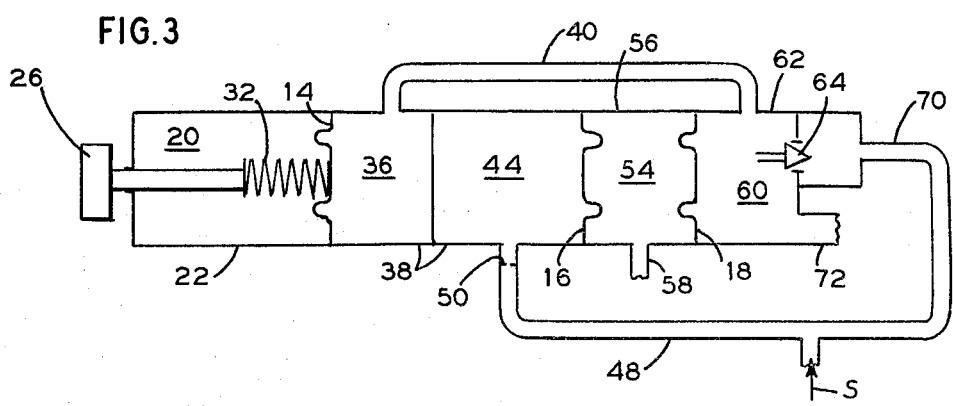
FIG. 3 is a schematic representation of the connecting passageways of the FIG. 1 regulator.

With particular reference to FIGS. 1 through 3 it will be seen that a pressure regulator assembly 10 is formed to have a housing assembly 12 joined together by screws 13 and providing various sealed compartments separated by flexible diaphragms 14, 16, and 18.

An input signal compartment 20 is formed between housing section 22 and the diaphragm 14 within which an adjustable spring assembly 24 is mounted to adjustably load the diaphragm 14. This loading is accomplished by turning a knob 26 which causes a threaded member 28 to rotate and move a complementary threaded nut 30 to linearly move along the member 28 to compress or relax a spring 32. The spring 32 transmits its spring force against the diaphragm 14 through a spring mounting member 34. It will be understood that the diaphragm 14 could just as easily be variably loaded by pressurizing the chamber 20 to different input pressures applied thereto.

The input load on the diaphragm 14 is balanced by an opposing pressure established on the opposite side of the diaphragm 14 in a feedback chamber 36. The feedback chamber 36 is formed by sealing a cavity formed in a housing section 38 by the diaphragm 14. The opposing pressure is provided by connecting the output pressure of the regulator 10 in feedback to the chamber 36 along a passageway 40. The diaphragm 14 thus acts as a summing station which continuously monitors the difference in pressure applied to the diaphragm 14 by the spring 32 and the feedback chamber 36 and moves in the appropriate direction in response to a pressure difference therebetween.

Movement of the diaphragm 14 causes proportional movement of a coupling pin 42 which sealably extends from the feedback chamber 36 into a nozzle backpressure chamber 44 through a sealed guide member 46. The nozzle chamber 44 is formed between a second cavity in the housing section 38 and the diaphragm 16 and is supplied with supply air from a line 48 connected to an air supply S. The line 48 has an orifice 50 mounted therein to provide a predetermined gain to a vane and nozzle assembly 52 mounted in the nozzle chamber 44. As is best seen with reference to FIGS. 4 and 5 the vane and nozzle assembly 52 is affixed to the diaphragm 16 to be movable with the diaphragm 16. This eliminates time delays caused by indirectly acting stationary nozzle assemblies. The vane and nozzle assembly 52 vents a predetermined amount of the supply air S from the nozzle chamber 44 into a vent chamber 54 formed by sealing a housing section 56 between the diaphragms 16 and 18. The vent chamber 54 is maintained at substantially atmospheric pressure by a vent passageway 58 communicating with the ambient to eliminate pressure effects on the diaphragm 16 from the vent chamber 54. The vane and nozzle assembly 52 is also mounted to the diaphragm 18 which forms an output chamber 60 with housing section 62. This mounting arrangement makes the vane and nozzle assembly 52 movable in response to a pressure change in the nozzle chamber 44 and the output chamber 60 since the middle vent chamber 54 is maintained at atmospheric pressure. The diaphragm 18 is significantly smaller in area than the diaphragm 16 to make the nozzle chamber 44 pressure the dominant force in determining the motion of the vane and nozzle assembly 52. The vane and nozzle assembly 52 operates a valve plug 64 which variably restricts the flow of supply air from a supply chamber 66 to the output chamber 60 through a passageway 68 to thereby vary the output pressure in chamber 60. The valve plug 64 is not affixed to the assembly 52 and thus movement of the assembly 52 also variably restricts the flow of output air from output chamber 66 to the vent chamber 54. Supply air is communicated to the output chamber 60 along line 70 connected to the air supply S. This direct coupling of the vane and nozzle assembly 52 to the valve plug 64 eliminates any time delay between actuation and regulator 10 output insuring stable operation of the regulator.

Figure 5:
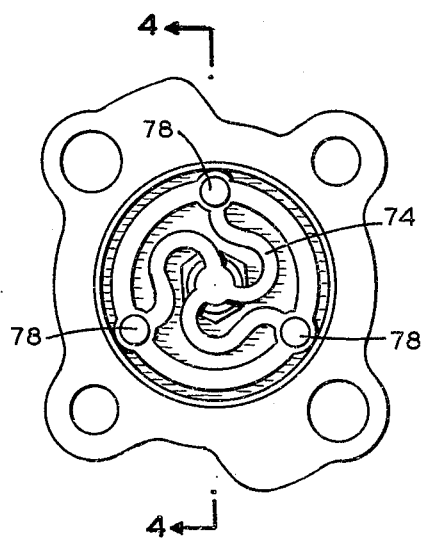
FIG. 5 is a front view of the vane of the FIG. 4 assembly.
Figure 4:
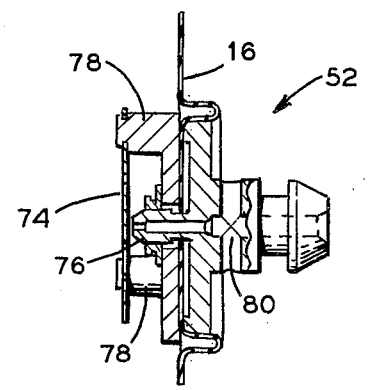
FIG. 4 is a cross-sectional view of the vane and nozzle assembly of the FIG. 1 regulator taken along the line 4-4 of FIG. 5.

As specifically shown in FIG. 1 the regulator 10 is connectable to the air supply S with the spring assembly 24 unloaded and the valve plug 64 sealing the passageway 68 to prevent the flow of supply air to the output chamber 60. Thus the output pressure of an outlet plug 72 of the regulator 10 is zero and the feedback pressure in the feedback chamber 36 is also zero. The air supply S is feeding the nozzle chamber 44 but it is being vented into the vent chamber 54 by the vane and nozzle assembly 52. As the knob 26 is rotated to compress the spring 32 a force is exerted on the diaphragm 14 causing the diaphragm 14 and the coupling pin 42 to move toward a vane 74 of the vane and nozzle assembly 52. As is best seen in FIGS. 4 and 5 the vane 74 is directly coupled to a nozzle 76 of the vane and nozzle assembly 52 through a spacer 78 to allow the vane 74 to be flexible under pressure from the coupling pin 42. Flexing of the vane 74 sets up a different vane 74 to nozzle 76 clearance which affects the venting of supply air from the nozzle chamber 44. The specific movement of the coupling pin 42 toward the vane 74 causes a deflection of the vane 74 toward the nozzle 76 to restrict the venting of supply air from the nozzle chamber 44 through nozzle 76 to the vent chamber 54 by way of a passageway 80. This restriction establishes an increased pressure in the nozzle chamber 44. This increased pressure in the nozzle chamber 44 acting on the diaphragm 16 along with the force transmitted by the coupling pin 42 to the vane and nozzle assembly 52 by the vane 74 causes the vane and nozzle assembly 52 to move in a direction which will restore the original vane 74 to nozzle 76 spacing. The mentioned movement of the vane and nozzle assembly 52 causes the valve plug 64 to open the passageway 68 and pressurize the output chamber 60 to a level determined by the valve plug 64 to passageway 68 and 80 clearances. As was mentioned earlier, the pressure in the output chamber 60 is communicated to the feedback chamber 36 along passageway 40 to balance the newly adjusted force of the spring assembly 24. While the feedback chamber 36 is thusly being pressurized to the output chamber 60 pressure, the vane and nozzle assembly 52 is moving away from the coupling pin 42 to relieve the vane 74 and restore the vane 74 to nozzle 76 clearance. The vane and nozzle assembly 52 will continue to move until the predetermined vane 74 to nozzle 76 clearance is reached. The predetermined clearance will pressurize the nozzle chamber 44 to a pressure acting on diaphragm 16 which will be balanced by the pressure in output chamber 60 acting on the diaphragm 18. It is understood that movement of the diaphragm 14 and the coupling pin 42 ceases when the pressure in the feedback chamber 36 acting on the diaphragm 14 balances the force of the spring assembly 24.

From the foregoing it will be seen that the regulator will establish balance positions for the summing diaphragm 14 and the vane and nozzle assembly 52 for different output pressure conditions depending upon the adjustment of the loading spring 32. These different balance conditions will be arrived at without any stability problems due to the anticipatory action of the vane and nozzle assembly 52 moving in response to a new loading condition in a direction which will restore the desired vane 74 and nozzle 76 spacing while simultaneously changing the output feedback pressure to the desired level. This effectively eliminates the phase shifts due to signal time delays and prevents instability.

Certain modifications and improvement will occur to those skilled in the art upon reading of the foregoing. It should be understood that all such modifications and improvements were deleted for the sake of conciseness and readability but are properly included within the scope of the claimed invention.

What we claim is:

1. A pneumatic pressure regulator comprising:
a housing forming an input chamber, a nozzle chamber, an output chamber, a vent chamber, and a feedback chamber;
a first flexible diaphragm mounted between said input chamber and said feedback chamber to move in response to a pressure difference therebetween;
a second flexible diaphragm mounted between said nozzle chamber and said vent chamber to move in response to a pressure difference therebetween;
a vane and nozzle assembly mounted on said second diaphragm to exhaust fluid from said nozzle chamber to said vent chamber according to the spacing between the vane and the nozzle of said vane and nozzle assembly and provide a pressure difference between said nozzle chamber and said vent chamber;
a coupling member connecting said first diaphragm to said vane to vary the spacing between the vane and the nozzle; and
output means for varying the pressure in said output chamber in response to movement of said vane and nozzle assembly.

2. A regulator as set forth in claim 1 including a third diaphragm mounted between said vent chamber and said output chamber to move in response to a pressure difference therebetween and wherein said vane and nozzle assembly is also mounted to said third diaphragm to move in response to the pressure difference between said output chamber and said nozzle chamber.

3. A regulator as set forth in claim 2 including an air supply connected to said nozzle chamber and to said output chamber and wherein said output means includes a valve plug mounted in said output chamber and being operatively connected to said vane and nozzle assembly to vary the flow of supply air to said output chamber.

4. A regulator as set forth in claim 2 wherein said output means includes a connecting passageway between said output chamber and said feedback chamber to balance the pressure therebetween.

5. A regulator as set forth in claim 4 including a spring loading assembly mounted in said input chamber to vary the pressure applied to said first diaphragm and vary the pressure in said output chamber thereby. the pressure in said output chamber thereby.

6. A pressure regulator comprising:
output means including a valve plug for providing different output pressures corresponding to different valve plug positions;
a nozzle chamber;
a pressure balance assembly operatively connected to the valve plug of said output means to move the valve plug to different positions in response to movement of said pressure balance assembly, said pressure balance assembly including a vent nozzle flexibly mounted in said nozzle chamber for venting said nozzle chamber and a vane connected to said nozzle to controllably restrict the venting of said nozzle chamber through said nozzle to pressurize said nozzle chamber thereby;
input means for moving said pressure balance assembly including an input signal chamber, a feedback chamber connected to the output of the regulator, a first flexible diaphragm sealably separating said input chamber from said feedback chamber, and a coupling operatively connecting said vane to said flexible diaphragm to move said vane with respect to said nozzle in response to movement of said flexible diaphragm;
a vent chamber;
a second flexible diaphragm separating said nozzle chamber from said vent chamber;
an output pressure chamber having said valve plug mounted therein;
a third flexible diaphragm separating said vent chamber from said output chamber; and wherein
said vent nozzle is rigidly mounted to said second and third diaphragm to have an inlet port communicating with said nozzle chamber, an outlet port communicating with said vent chamber to exhaust said chamber therein, and a connecting member located in the output chamber to join with said valve plug to move said valve plug in response to movement of said vent nozzle.

7. A pressure regulator as set forth in claim 6 including:
a supply line connected to said nozzle chamber;
a restriction located in said supply line to provide a predetermined gain to said vane and nozzle assembly.

* * * * *